H. E. BAKER.
SILO.
APPLICATION FILED SEPT. 4, 1918.

1,304,521.

Patented May 20, 1919.

Inventor.
Howard E. Baker
by Hubert W. T. Jenner
Attorney.

UNITED STATES PATENT OFFICE.

HOWARD E. BAKER, OF ASH, OREGON.

SILO.

1,304,521. Specification of Letters Patent. Patented May 20, 1919.

Application filed September 4, 1918. Serial No. 252,531.

*To all whom it may concern:*

Be it known that I, HOWARD E. BAKER, a citizen of the United States, residing at Ash, in the county of Douglas and State of Oregon, have invented certain new and useful Improvements in Silos, of which the following is a specification.

This invention relates to silos for holding vegetable matter; and it consists in the novel construction and combination of the parts hereinafter fully described and claimed.

Figure 1:
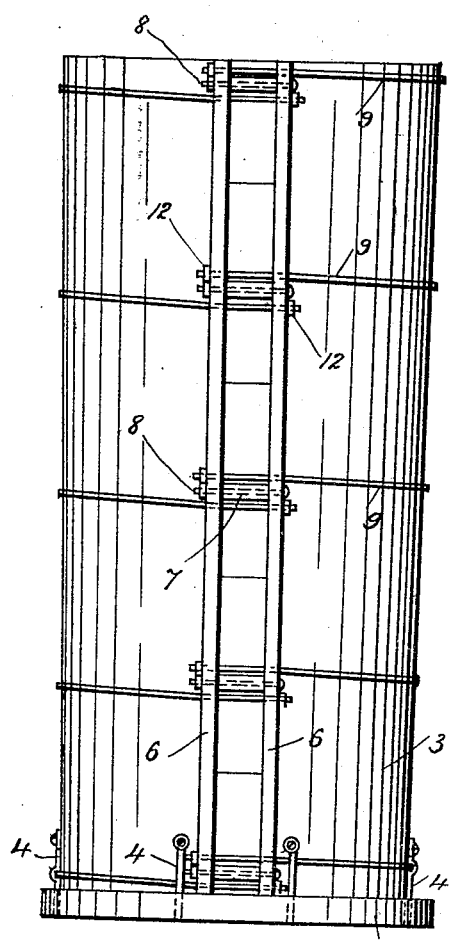
Figure 3:
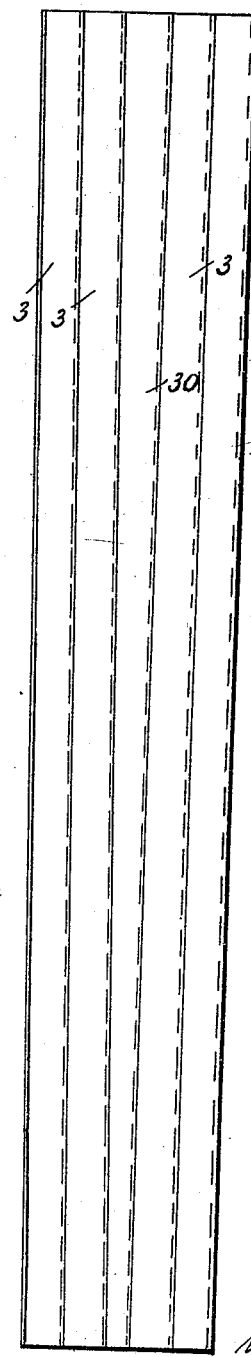
Figure 4:
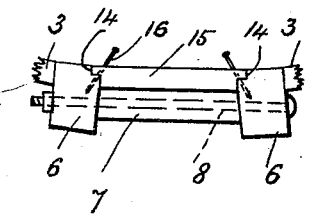
Figure 5:
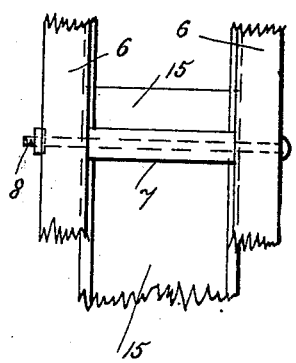
Figure 2:
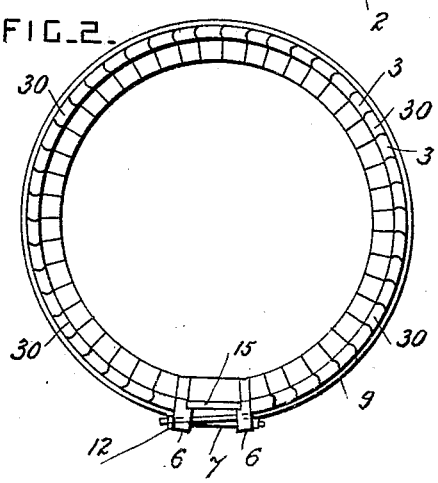

In the drawings, Figure 1 is a front view of a silo constructed according to this invention. Fig. 2 is a plan view of the same. Fig. 3 is a detail front view of certain of the staves, drawn to a larger scale. Fig. 4 is a plan view of the door portion of the silo. Fig. 5 is a front view of the parts shown in Fig. 4.

The silo is provided with a base 2 of cement or other similar material. The body of the silo is preferably circular, and it is formed of a series of wooden staves 3, and is anchored to the base 2 by bolts 4 or other suitable means.

The staves are preferably jointed together by curved or concavo-convex joints. Each stave is curved inwardly on one side edge, and is curved outwardly on the opposite edge, so that all the staves may fit together automatically and be watertight. In order to preserve the compactness of or to compress the vegetable matter slightly as it settles in the silo, the body portion is made of larger diameter at the top than at the bottom. The amount of taper is carefully predetermined so as to compact or compress the vegetable matter to the desired extent, and at the same time not place too much strain on the lower end portion of the silo and its bottom hoops. In the drawing, Fig. 1, the taper is shown somewhat exaggerated for clearness. A silo 32 feet high and 10 feet in diameter at the bottom can satisfactorily be made 10 feet 6 inches in diameter at its top.

In order to produce the required taper certain of the staves, 30, are made tapering, being about 6 inches wide at the top and about 2 inches wide at the bottom, when four of them are used in a silo of the above stated size. These tapering staves are preferably arranged at equal distances apart, and the other staves 3 are all made with parallel side edges.

The door portion of the silo is formed of two door jambs 6 which extend the full height of the silo the same as the staves, and which are inserted between two of the staves, and which also project forwardly of them. Crossbars 7 are arranged at suitable intervals between the outer portions of the two door jambs, and are secured in holes or sockets in the jambs by means of bolts 8 which pass through holes in the jambs and crossbars.

The staves and door jambs are held together in circular form by means of rods or hoops 9 which encircle the body of the silo at suitable levels and which bear against the staves.

The end portions 10 of these hoops are passed through holes in the jambs, and they are arranged upon opposite sides of the crossbars 7, and are provided with screw-threaded portions and nuts 12 so that they can secure the staves and jambs together, when the nuts are tightened up.

The rear portions of the door jambs 6 are provided with longitudinal grooves 14, and 15 are the doors which are formed in sections and which engage with the grooves. The doors can be slid longitudinally in the grooves, and can be secured in them, when desired, in any approved way. The doors can be secured to the jambs by nails 16, if desired, but any suitable fastening devices can be used.

A silo constructed in this manner is inexpensive to build, and is found to give good satisfaction in use.

What I claim is:

In a silo, a base, a tapering body portion secured in watertight relation to the base and comprising a plurality of series of staves arranged on circular arcs, each series being formed of a multiplicity of similar and interchangeable staves having parallel sides, and single staves having tapering sides inserted between the series of staves having parallel sides so that the body portion is larger at the top than at the bottom, all the said staves being of substantially equal thickness, and hoops encircling the body portion and clamping all the staves together.

In testimony whereof I have affixed my signature.

HOWARD E. BAKER.

Copies of this patent may be obtained for five cents each, by addressing the "Commissioner of Patents, Washington, D. C."